United States Patent

Baumann

[11] Patent Number: 6,024,382
[45] Date of Patent: Feb. 15, 2000

[54] SEAT BELT INCLUDING TRANSMISSION COIL FOR COMMUNICATION WITH TRANSPONDER AND TRANSPONDER COMMUNICATION DEVICE

[75] Inventor: Konrad Baumann, Graz, Austria

[73] Assignee: U.S. Philips Corporation, New York, N.Y.

[21] Appl. No.: 09/009,744

[22] Filed: Jan. 20, 1998

[30] Foreign Application Priority Data

Jan. 21, 1997 [EP] European Pat. Off. .............. 97890010

[51] Int. Cl.⁷ .................................................. B60R 22/00
[52] U.S. Cl. ...................... 280/801.1; 280/808; 180/268; 180/286; 180/287; 343/711; 343/712
[58] Field of Search ............................. 280/801.1, 801.2, 280/807, 808; 180/268–271, 286, 287; 297/482, 483; 343/711–717

[56] References Cited

U.S. PATENT DOCUMENTS

| | | | |
|---|---|---|---|
| 4,973,958 | 11/1990 | Hirano et al. ......................... | 340/825 |
| 5,134,392 | 7/1992 | Takeuchi et al. ...................... | 340/825 |
| 5,324,112 | 6/1994 | Palazzetti et al. ..................... | 374/109 |
| 5,563,453 | 10/1996 | Nyfelt .................................... | 307/10.2 |
| 5,679,984 | 10/1997 | Talbot et al. .......................... | 307/10.3 |
| 5,711,392 | 1/1998 | Budel ..................................... | 180/287 |
| 5,719,550 | 2/1998 | Bloch et al. ........................... | 340/426 |
| 5,751,073 | 5/1998 | Ross ...................................... | 307/10.5 |
| 5,758,737 | 6/1998 | Brown et al. .......................... | 180/268 |

*Primary Examiner*—J. J. Swann
*Assistant Examiner*—L. Lum

[57] ABSTRACT

A seat belt includes a transmission coil for connection to a transponder communication device, and for receiving transponder signals from a transponder. The seat belt is adjustable between a released position and a fastened position. In its fastened position, the seat belt can secure a person to a seat.

A seat belt assembly for use in a vehicle includes the seat belt and a transponder communication device, wherein the seat belt comprises a transmission coil which receives transponder signals.

9 Claims, 6 Drawing Sheets

SEAT BELT INCLUDING TRANSMISSION COIL FOR COMMUNICATION WITH TRANSPONDER AND TRANSPONDER COMMUNICATION DEVICE

BACKGROUND OF THE INVENTION

The invention relates to a product including a seat and a seat belt which is adjustable between a released position and a fastened position, by means of which seat belt in its fastened position a person can be secured to the seat, and including a transponder-communication device for the contacless communication with a transponder which supplies at least one type of control information, and including a transmission coil for receiving transponder signals each containing at least one type of control information, which transmission coil is mechanically attached to a part of the product and which is electrically connected to the transponder communication device, in which device identification information representing at least a part of the received transponder signal can be determined.

Such a product motor vehicle of the type defined in the opening paragraph is known from, for example, the document U.S. Pat. No. 5,134,392 A. This known product concerns a motor vehicle in which the transmission coil, which is electrically connected to the transponder communication device and which serves to receive transponder signals, is accommodated in a cavity of the driver's door of the motor vehicle at a predetermined unchangeable location. Viewed from outside the passenger compartment of the motor vehicle, the transmission coil is located behind the steel outer panel of the driver's door, as a result of which the metal outer panel has a certain shielding effect, which affects the transmission field strength and the reception sensitivity of the transmission coil accommodated in the recess of the driver's door. Moreover, it is to be noted that owing to the location of the transmission coil in the recess of the driver's door the distance between the transmission coil and a person in the driver's seat is comparatively large, which comparatively large distance gives rise to communication problems between the transmission coil and a transponder arranged in the clothing of the driver in the driver's seat.

SUMMARY OF THE INVENTION

It is an object of the invention to preclude the aforementioned problems and to improve a product of the type defined in the opening paragraph in such a manner that always a trouble-free communication is guaranteed between a transponder and the transponder coil which is electrically connected to the transponder communication device. In a product of the type defined in the opening paragraph this object is achieved in that the transmission coil is mechanically attached to the adjustable seat belt. As a result of this, it is achieved in a very simple and cheap manner that the transmission coil which is electrically connected to the transponder communication device cannot only assume a single stationary position but is adjustable between at least two operating positions and, consequently, the communication quality between the transmission coil and a transponder can simply be adapted to different operating situations by moving the transmission coil between its operating positions.

In a product in accordance with the invention it has proved to be advantageous if the transmission coil is accommodated in a substantially disc-shaped plastic holder to which fastening means are connected, by which fastening means the holder is attached to the seat belt. Thus, it is achieved that afterwards it is also possible to attach a transmission coil to a seat belt in a simple manner.

In a product of the type defined in the preceding paragraph it has further proved to be very advantageous if the fastening means are formed by a substantially U-shaped fastener whose fastener limbs adjoin the seat belt. Thus, the holder can simply be attached to a seat belt.

However, in a product in accordance with the invention it has also proved to be advantageous if the transmission coil is accommodated in a holder which can be folded up in a meandrous or zigzag fashion during adjustment of the seat belt from its fastened position into its released position and which can be unfolded along the seat belt during adjustment of the seat belt from its released position into its fastened position, to which holder fastening means are connected, by which the holder is attached to the seat belt. Such an embodiment has proved to be particularly advantageous during testing.

In a product of the type defined in the preceding paragraph it has proved to be particularly advantageous if at least two meander sections, linked by a meander link, each accommodate a transmission coil, the coil sections being electrically interconnected, and in the folded-up condition of the holder the winding planes of the coil sections accommodated in the meander sections, which then adjoin one another, are disposed substantially parallel to one another in a stack-like manner. Thus, it is achieved that in the folded-up condition of the meandrous or zigzag-shaped fold-up holder the coil sections accommodated in the individual meander sections adjoin one another substantially parallel and in a stack-like manner, as a result of which a transmission coil is obtained which has a particularly high transmission power and particularly high reception sensitivity in the folded-up condition of the meandrous or zigzag-shaped fold-up holder, and that in the unfolded condition of the meandrous or zigzag-shaped fold-up holder a plurality of coil sections are disposed adjacent a person which is secured in the seat by the seat belt which is then in its fastened position, so that owing to the plurality of active coil sections in any case a good communication via at least one of these coil sections is guaranteed with a transponder situated in the clothing of the person wearing the belt and thus situated close to this at least one coil section.

In a product in accordance with the invention in which the transmission coil is attached to the seat belt by means of a holder, it has proved to be particularly advantageous if the holder is adjustably attached to the seat belt by the fastening means connected to said holder. This results in a simple adjustment of the transmission coil along the seat belt.

In a product in accordance with the invention it has further proved to be very advantageous if the transmission coil is integrated in the seat belt. This ensures a very reliable mounting of the transmission coil.

In all the afore-mentioned variants of a product in accordance with the invention it has proved to be very advantageous if the transmission coil is electrically connected to contact means via electrically conductive connecting means, which contact means are arranged in the area of an end portion by which the seat belt is secured to an anchor part of the product and engage with mating contact means arranged in the area of the anchor part. This provides a simple electrically conductive connection between a transmission coil, which is mechanically connected to a seat belt, and a transponder communication device.

However, in variants of a product in accordance with the invention it has also proved to be advantageous if the transmission coil is electrically connected to contact means which are mechanically connected to the seat-belt lug of the seat belt and which are engageable with mating contact means which are mechanically connected to the seat-belt buckle of the seat belt. Thus, it is achieved in a simple manner that the transmission coil, which is mechanically connected to a seat belt, is not electrically connected to the transponder communication device until the seat belt has been fastened, as a result of which communication between a transponder and the transponder communication device via the transmission coil is only possible when the seat belt has been fastened, which is desirable in some operational situations.

A product in accordance with the invention can be, for example, an aircraft seat. Moreover, a product in accordance with the invention can be a patient chair in a dental practice. It has proved to be very favorable when the product is a motor vehicle. In a motor vehicle the measures in accordance with the invention appear to be very favorable because, as a result of these measures, a transmission coil attached to the seat belt for the driver's seat can simply be brought in a first operating position near the window of the driver's door as well as in a second operating position adjacent the driver's body, so that in the first operating position a good communication with a transponder outside the motor vehicle and in the second operating position a good communication with a transponder in the driver's clothing is guaranteed.

The above-mentioned as well as further aspects of the invention will become apparent from the embodiments described hereinafter by way of examples and will be elucidated with reference to these embodiments.

BRIEF DESCRIPTION OF THE DRAWING

The invention will now be described in more detail with reference to some embodiments which are shown in the drawings but to which the invention is not limited.

DESCRIPTION OF THE PREFERRED EMBODIMENTS

Figure 1:
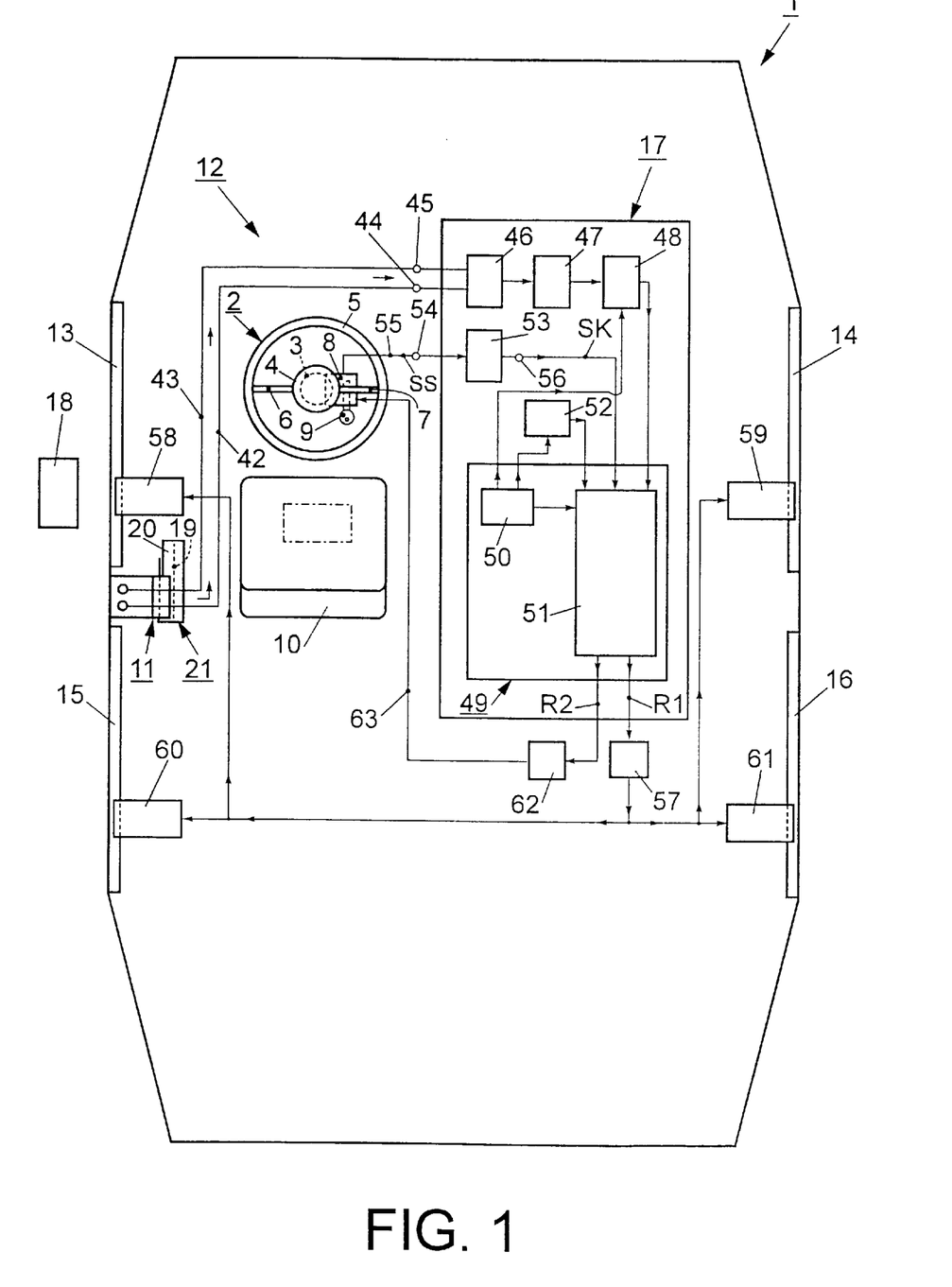
FIG. 1 diagrammatically shows a product in accordance with a first embodiment of the invention, which takes the form of a motor vehicle and includes a transponder communication device and a transmission coil, which coil is electrically connected to this device, is mechanically connected to the seat belt for the driver's seat and is accommodated in a disc-shaped holder.

FIG. 1 shows a product in accordance with the invention in the form of a motor vehicle 1 in a highly diagrammatical manner. The motor vehicle 1 has a steering wheel 2. The steering wheel 2 has an inner hub portion 4, which is connected to the steering column 3 of the motor vehicle 1, and a peripheral ring portion 5, the ring portion 5 being mechanically connected to the hub portion 4 by means of two spokes 6 and 7. At the location of the steering column 3 an ignition lock 8 has been arranged, in which an ignition key 9 can be inserted to start the engine of the motor vehicle 1. However, instead of an ignition lock another starting device may be used such as a simple starting button.

Figure 5:
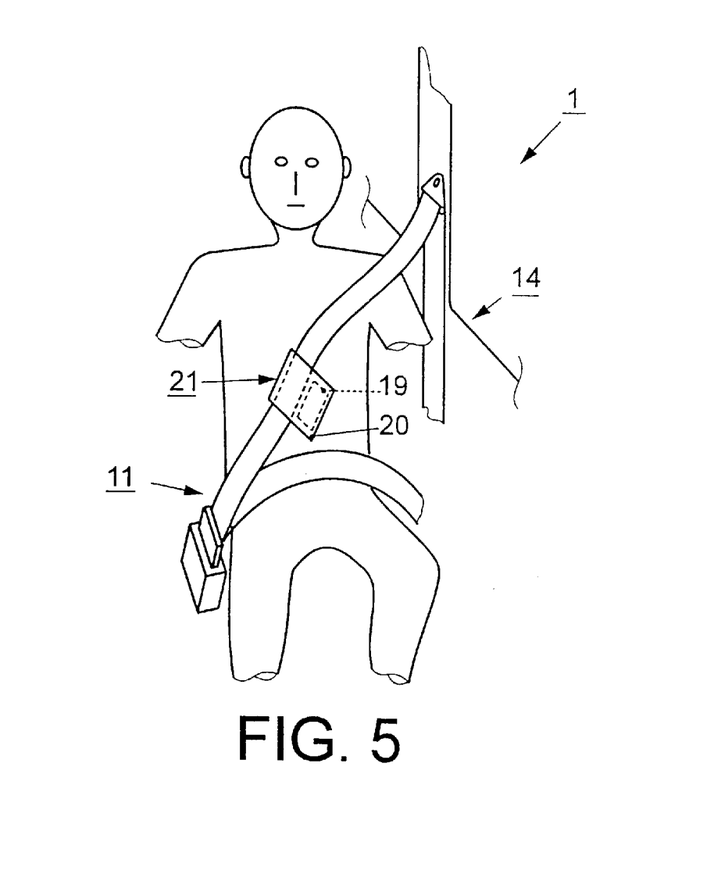
FIG. 5 is a diagrammatic oblique view showing the seat belt for the driver's seat in its fastened position in which its is worn by a driver, the holder including the transmission coil and attached to the seat belt being disposed adjacent the body of the driver.

The motor vehicle 1 further comprises a seat, i.e. the driver's seat 10. Obviously, the motor vehicle 1 has further seats but these are not shown in FIG. 1. The motor vehicle 1 further has a seat belt 11 for the driver's seat 10, which belt is adjustable between a release position and a fastened position and is shown only diagrammatically in FIG. 1, its construction being also shown diagrammatically though more realistically in FIGS. 2 and 5. By means of the seat belt 11 for the driver's seat 10 a person can be fastened to the driver's seat 10, as is shown diagrammatically in FIG. 5. It is obvious that the motor vehicle 1 also has a seat belt for each of the other seats, but this is not shown in FIG. 1.

The motor vehicle 1 further comprises an authorization verification system 12. By means of the authorization verification system 12 it is possible to control the access to the passenger compartment in the motor vehicle 1 via the four doors 13, 14, 15 and 16 of the motor vehicle 1 and, moreover, to control starting of the engine of the motor vehicle 1.

The authorization verification system 12 of the motor vehicle 1 comprises a transponder-communication device 17 designed for the contactless communication with at least one transponder, which transponder controls the access authorization through the doors 13, 14, 15 and 16 by means of control information, i.e. authorization information, and which controls the authorization to start the engine of the motor vehicle 1 by means of further control information, i.e. further authorization information. Such a transponder 18, which takes the form of a card, is shown diagrammatically in solid lines in FIG. 1 outside the motor vehicle 1 next to the driver's door 8. Furthermore, such a transponder 18 is shown diagrammatically in broken lines in FIG. 1 inside the passenger compartment in the proximity of the steering wheel 2.

The authorization verification system 12 of the motor vehicle 1 further comprises a transmission coil 19 adapted to receive transponder signals which each contain at least one type of control information, i.e. authorization information. The transmission coil 19 is arranged in the interior of the motor vehicle 1 and is mechanically connected to a part of the motor vehicle 1.

Figure 4:
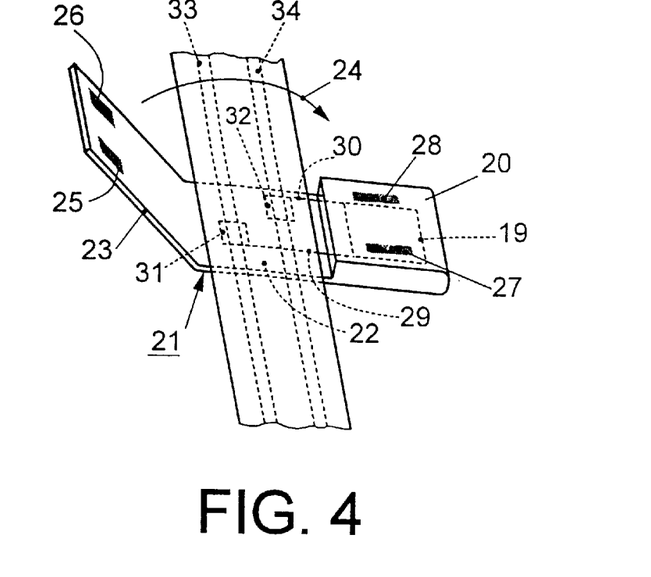
FIG. 4 is an oblique view of the transmission-coil holder already shown in FIGS. 1 to 3, and the fastening means with which the holder can be attached to the seat belt for the driver's seat.

In the present case of the motor vehicle 1 shown in FIGS. 1 to 5 the transmission coil 19 is mechanically connected to the seat belt 11 in an advantageous manner. As is apparent in particular from FIG. 4, the transmission coil 19 is accommodated in a, preferably plastic, flat cuboid holder 20. Connected to the cuboid holder 20 are fastening means by which the holder 20 is attached to the seat belt 11. In the present case the fastening means are formed by a substantially U-shaped fastener 21 whose fastener limbs 22 and 23 adjoin the seat belt 11. The U-shaped fastener 21 also consists of a plastic having such a high elasticity that the two fastener limbs 22 and 23 can be bent open as shown in FIG. 4.

From the bent-open position of the two fastener limbs 22 and 23 of the U-shaped fastener 21 as shown in FIG. 4 the two fastener limbs 22 and 23 can be moved towards one another as indicated by the arrow 24 in FIG. 4 so as to position the two fastener limbs 22 and 23 onto the seat belt 11. In a direction transverse to the seat belt 11 the fastener limb 23 is longer than the fastener limb 22. Two adhesive fastening elements 25 and 26 arranged near the free ends of the fastener limb 23 can be brought into adhesive contact with two further adhesive fastening elements 27 and 28 arranged on the cuboid holder 20. By means of the two adhesive fastening elements 25 and 26 and the two further adhesive fastening elements 27 and 28 the fastener limbs 22 and 23 of the U-shaped fastener 21 are attached to the seat belt 11 by clamping, i.e. in a non-positive manner. In order to obtain an adequate clamping force the fastener limbs 22 and 23 of the U-shaped fastener 21 are given sufficiently rough surfaces at least in their areas which cooperate with the seat belt 11. By means of the U-shaped fastener 21 forming the fastening means the holder 20 is adjustably attached to the seat belt 11.

The transmission coil 19 is electrically connected to the transponder-communication device 17. To form this electrically conductive connection the following means have been provided. As is apparent from FIGS. 2, 3 and 4, the transmission coil 19 has two connecting leads 29 and 30. The two connecting leads 29 and 30 are passed both through the cuboid holder 20 and, partly, through one fastener limb 22, i.e. each connecting lead extends up to a respective free contact face 31 or 32 in the area of that bounding surface of the fastener limb 22 which faces the seat belt 11. Since the two fastener limbs 22 and 23 are clamped onto the seat belt 11, the two contact faces 31 and 32 are each in electrically conductive contact with a respective connecting lead 33 or 34 provided on the seat belt 11. Each of the two connecting leads 33 and 34 is electrically connected to a contact pin 35 and 36, respectively. The two contact pins 35 and 36 are arranged in the area of an end portion 38 by which the seat belt 11 is secured to an anchor part 37 of the motor vehicle 1. At its end 38 the seat belt 11 is mechanically secured to the anchor part 37 by means of an anchor plate 39 fastened by means of screws. Each of the two contact pins 35 and 36 is in contact with a contact socket 40 and 41. The two contact sockets 40 and 41 are disposed in the area of the anchor part 37. A respective connecting lead 42 or 43 extends from each of the two contact sockets 40 and 41 to a respective input 44 or 45 of the transponder communication device 17.

The transponder-communication device 17 is adapted to detect identification information representing at least a part of a received transponder signal. In the present case the authorization information contained in a received transponder signal can be detected. For this purpose, the transponder-communication device 17 comprises an amplifier 46 which is connected to the two inputs 44 and 45 and which amplifies the transponder signals supplied by the transmission coil 19. The amplifier 46 is followed by an authorization information detector 47 by means of which the authorization information in a transponder signal, which information is formed for example by a code, can be determined or detected. Authorization information detected by means of the authorization information detector 47 can be stored as identification information in an authorization information memory 48 which follows the authorization information detector 47. However, alternatively it is possible to derive identification information from the detected authorization information.

The transponder-communication device 17 further includes a microcomputer 49. By means of the microcomputer 49 a control device 50 is realized. Moreover, a logic device 51 is realized by means of the microcomputer 49.

The transponder-communication device 17 further includes a reference authorization information memory 52, which can store or stores reference authorization information. In the case that identification information is derived the authorization information detected by means of the authorization information detector 47, corresponding reference identification information is stored or can be stored in the reference authorization information memory 52.

The transponder communication device 17 further has a starter detector 53 connected to the ignition lock 8 via a connecting lead 55 connected to a further input 54 of the transponder communication device 17. By means of the starter detector 53 it is possible to detect a starter signal SS, which can be generated in the ignition lock and which indicates that an ignition key 9 has been introduced into the ignition lock 8 and has been actuated so as to initiate a starting process. When an ignition key 9 for the motor vehicle 1 is inserted into the ignition lock 8 and is subsequently turned in order to initiate a starting process, the starter signal SS is generated and is detected by means of the starter detector 53 of the transponder communication device 17, upon which the starter detector 53 produces starter identification information SK on its output 56.

When in the motor vehicle 1 shown in FIGS. 1 to 5 for example the driver, who wears a transponder 18 in his clothing, approaches the motor vehicle 1 in the area of the driver's door 13 the transponder 18 situated in the proximity of the driver's door 13 supplies a transponder signal containing authorization information, in response to an appropriate request from the transponder communication device 17, which will not be described any further here because it is not relevant in the present case, which transponder signal is received by the transmission coil 19 attached to the seat belt 11. The received transponder signal is amplified by means of the amplifier 46 and is subsequently applied to the authorization information detector 47 by means of which the authorization information contained in the received transponder signal is detected. After this, the detected authorization information is stored in the authorization information memory 48.

By means of the control device 50 of the microcomputer 49 it is possible to generate control information and to apply this information to the authorization information memory 48, to the reference authorization information memory 52 and to the logic device 51. When the control information is applied from the control device 50 to the two memories 48 and 53 the authorization information, stored as identification information in the authorization information memory 48 and originally supplied by the transponder 18 located outside the motor vehicle 1—upon an appropriate request and the reference authorization information, stored as reference identification information in the reference authorization information memory 52, are applied to the logic device 51 of the microcomputer 49. The logic device 51, which is also controlled by control information from the control device 50, compares the authorization information originally supplied by the transponder 18 located outside the motor vehicle 1 and subsequently supplied by the authorization information memory 48 with the reference authorization information supplied by the reference authorization information memory 52. When both items of information correspond, the logic device 51 of the microcomputer 49 of the transponder communication device 17 supplies first release information R1 to a first amplifier 57. The amplified and, if necessary, converted first release information R1 is applied from the first amplifier 57 to four door openers 58, 59, 60 and 61, each associated with one of the doors 13, 14, 15 and 16, and causes the door openers 58, 59, 60 and 61 to be activated, as a result of which the doors 13, 14, 15 and 16 of the motor vehicle 1 are opened by means of the door openers 58, 59, 60 and 61.

After the doors 13, 14, 15 and 16 have been opened the passengers or at least the driver of the motor vehicle 1 can get into the motor vehicle 1. Subsequently, the driver brings the seat belt 11 from its release position into its fastened position. After this, the driver inserts the ignition key 9 into the ignition lock 8 and actuate the ignition key 9 or another starting device provided instead of the ignition lock 8, in order to start the engine of the motor vehicle 1. As a result of this, the ignition lock 8 or an alternative starting device supplies the starter signal SS to the input 54 of the transponder communication device 17 via S the connecting lead 55 and is transferred to the starter detector 53, upon which the starter detector 53 produces the starter identification information SK on its output 56, which information is applied to the logic device 51 of the microcomputer 49. When the driver seated on the driver's seat of the motor vehicle 1 carries a transponder 18, as shown diagrammatically in dash-dot lines in FIG. 1, the transponder 18, in response to an appropriate request from the transponder communication device 17, supplies a transponder signal containing authorization information to the transmission coil 19, which is mechanically connected to the seat belt 11 which is in its fastened position shown in FIG. 5, which signal is applied to the transponder communication device 17 via the two inputs 44 and 45. This transponder signal is amplified by means of the amplifier 46 and is then applied to authorization information detector 47, by means of which the authorization information contained in the transponder signal is detected and subsequently stored as identification information in the authorization information memory 48. Under control of the control device 50 the authorization information, stored as identification information in the authorization information memory 48 and originally supplied by the transponder 18 now located inside the motor vehicle 1, and the reference authorization information supplied as reference identification information by the reference authorization information memory 52, are applied to the logic device 51 of the microcomputer 49. The logic device 51 compares the authorization information originally supplied by the transponder 18 located inside the motor vehicle 1 and subsequently supplied by the authorization information memory 48 with the reference authorization information supplied by the reference authorization information memory 52, and in addition ascertains whether starter identification information SK has been supplied by the starter detector 53. When the authorization information and the reference authorization information correspond and, in addition, starter identification information has been generated, the logic device 51 supplies second release information R2 to a second amplifier 62. For security reasons the second release information R2 is preferably supplied in coded form. The amplified and, if necessary, converted second release information R2 is applied from the second amplifier 62 to the ignition lock 8 via a connecting lead 63. In the ignition lock 8 the second release information R2 causes the ignition lock 8 to be released and, as a result, the engine of the motor vehicle 1 to be actually started by means of the ignition key 9 inserted in the ignition lock 8. In practice, it is also possible and it may be advantageous to apply the coded second release information R2 to a separate electronic device of the motor vehicle 1, after which this electronic device enables the ignition lock 8 or an alternative starting device provided instead of the ignition lock 8 and, if applicable, any further parts of the motor vehicle 1.

The motor vehicle 1 described above with reference to FIGS. 1 to 5, in which the transmission coil 19 has been accommodated in a flat cuboid holder 20 which is adjustably attached to the seat belt 11 for the driver's seat 10 by means of a U-shaped fastener 21, has the advantage that the transmission coil 19, which is electrically connected to the transponder communication device 17, is adjustable between at least two operating positions in a simple manner and without any additional steps by adjusting the seat belt 11 between its release position and its fastened position, so that the communication quality between the transponder coil 19 and a transponder 18 can be adapted effectively and simply to different operating conditions by moving the transmission coil 19 between its two operating positions. When the seat belt is in its release position shown in FIGS. 1, 2 and 3 the transmission coil 19 occupies an operating position in the area of the door window at the driver's side of the motor vehicle 1, thus guaranteeing a particularly good contactless communication with a transponder 18 situated outside the motor vehicle 1. When the seat belt 11 is in its fastened position shown in FIG. 5 the transmission coil 19 is in an operating position adjacent the body of the driver of the motor vehicle 1, so that also in this case a transponder 18 arranged in the driver's clothing ensures a proper contactless communication.

Figure 6:
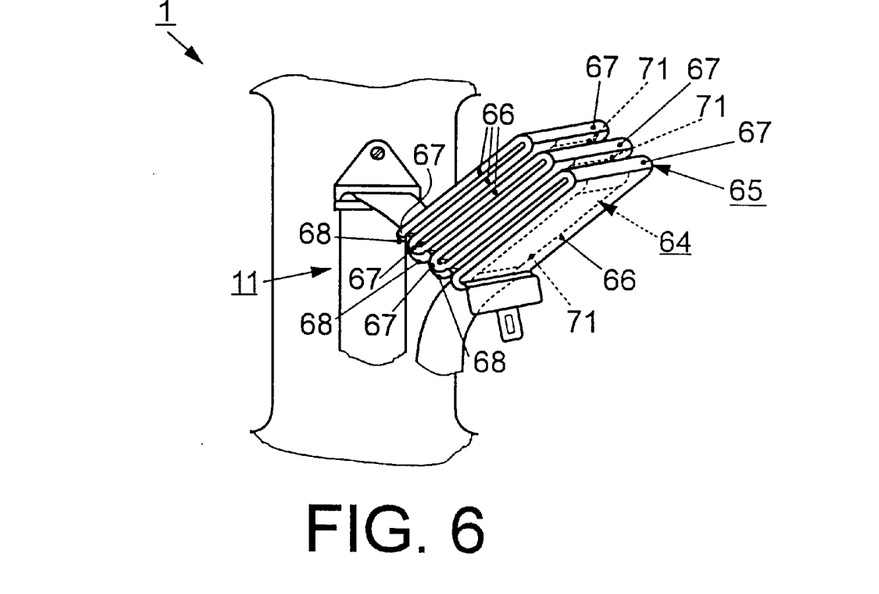
FIG. 6, in the same way as FIG. 2, shows a part of a product, i.e. a motor vehicle, in accordance with a second embodiment of the invention, which part includes the seat belt for the driver's seat, the seat belt for the driver's seat being in its released position and a meandrous or zigzag-shaped fold-up holder for a transmission coil, which holder is attached to the seat belt, being in its folded-up condition.
Figure 7:
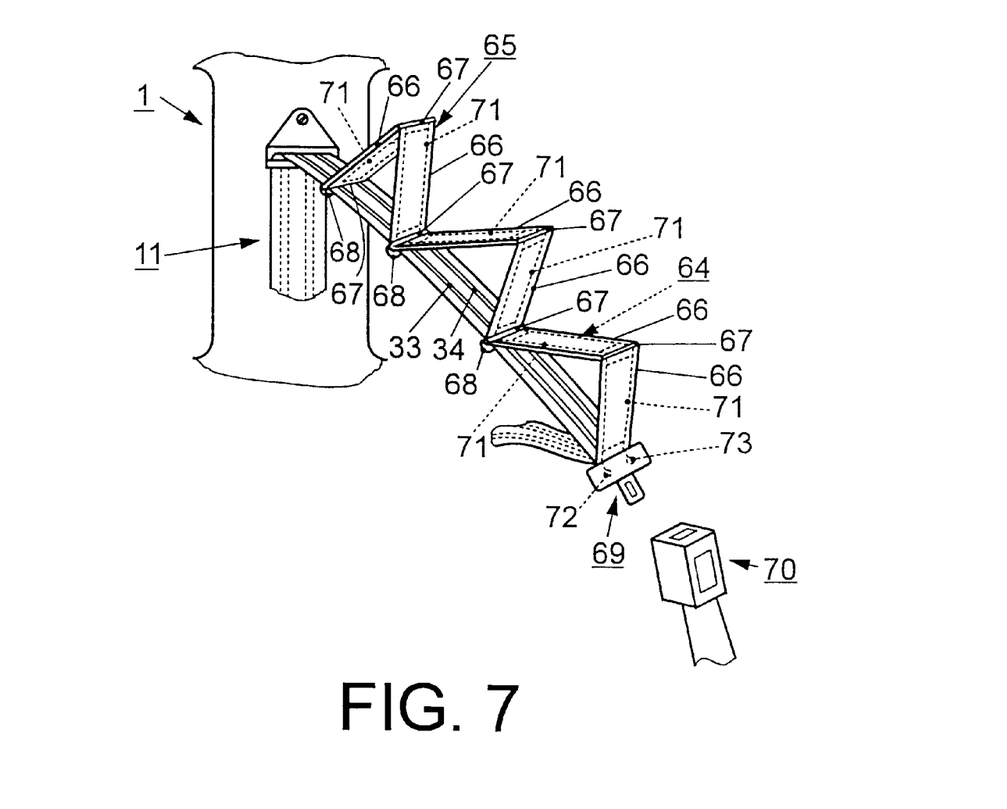
FIG. 7, in the same way as FIG. 6, shows a part of the motor vehicle in accordance with the second embodiment of the invention, which part includes the seat belt for the driver's seat, the seat belt for the driver's seat being in an intermediate position between its released position and its fastened position, in which intermediate position the meandrous or zigzag-shaped fold-up holder has already been unfolded for the greater part.
Figure 8:
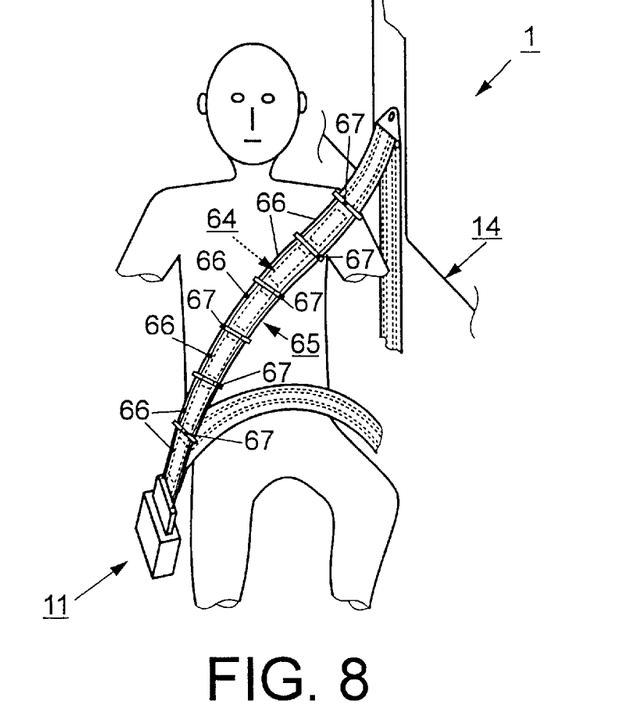
FIG. 8, in the same way as FIG. 5, shows the seat belt for the driver's seat of the motor vehicle in accordance with the second embodiment of the invention in its fastened position, the meandrous or zigzag-shaped fold-up holder being unfolded completely.

FIGS. 6, 7 and 8 show a part of a product in accordance with a second embodiment of the invention, which is also formed by a motor vehicle 1. In this motor vehicle 1 a transmission coil 64 is accommodated in a meandrous or zigzag-shaped holder 65 which can be folded up during adjustment of the seat belt 11 of the driver's seat from its fastened position into its released position and which can be unfolded along the seat belt 11 during adjustment of the seat belt from its released position into its fastened position. The holder 65 has six meander sections 66 in total which are interconnected via meander links 67. At their lateral ends three of the meander links 67 carry integral hooks 68, which hooks 68 engage around the seat belt 11 and in this way adjustably attach the holder 65 to the seat belt 11. The meander link at the location of the seat-belt lug 69, which link is not visible in FIGS. 6 to 8, is connected to the seat-belt lug 69, which is adjustable relative to the seat belt 11. The seat-belt lug 69, as is apparent from FIGS. 7 and 8, can be inserted into a seat-belt buckle 70 to fasten the seat belt 11.

Each of the meander sections 66, which are connected via a meander link 67, accommodates a coil section 71 of the transmission coil 64. The coil sections 71 are electrically interconnected. In the present case the coil sections 71 are electrically arranged in series, but this is not necessary. In the folded-up condition of the holder 65 the winding planes of the coil sections accommodated in the meander sections, which then adjoin one another, are disposed substantially parallel to one another in a stack-like manner, as can be seen in FIG. 6. The series-connected coil sections 71 are electrically connected to two contact faces 72 and 73. The two contact faces 72 and 73 are mechanically connected to the seat-belt lug 69 of the seat belt 11. In a manner not shown, the two contact faces 72 and 73 are electrically connected to two connecting leads 33 and 34 attached to the seat belt 11. The two contact faces 72 and 73 are mechanically connected to the seat-belt lug 69 of the seat belt 11. In a manner not shown, the two contact faces 72 and 73 are in electrically connected to connecting leads 33 and 34 attached to the seat belt 11. In the same way as in the motor vehicle 1 shown in FIGS. 1 to 5, the two connecting leads 33 and 34 are electrically connected to contact pins plugged into contact sockets which, by means of two connecting leads, are electrically connected to the transponder communication device of the motor vehicle 1 shown in FIGS. 6 to 8.

The motor vehicle 1 shown in FIGS. 6 to 8 also has the advantage that the transmission coil 64 is adjustable between two operating positions by adjustment of the seat belt 11 between its released position and its fastened position and that consequently the quality of the communication between the transmission coil 64 and at least one transponder can effectively be adapted in a simple manner to different operational situations by moving the transmission coil 64 between its operating positions. Another particularly advantageous feature of the motor vehicle 1 shown in FIGS. 6 to 8 is that in the folded-up condition of the meandrous or zigzag-shaped holder 65 the winding planes of the coil sections 71 accommodated in the individual meander sections 66 adjoin one another in a substantially parallel stack-like fashion, so that in the folded-up condition of the meandrous or zigzag-shaped fold-up holder 65 a transmission coil 64 having a particularly high transmission power and a particularly high reception sensitivity is obtained, thus guaranteeing a particularly good contactless communication with a transponder 18 situated outside the motor vehicle 1 when the seat belt 11 is in its released position as shown in FIG. 6. In the unfolded condition of the meandrous or zigzag-shaped fold-up holder 65 a plurality of coil sections are disposed adjacent a person which is secured in the seat by the seat belt 11 which is then in its fastened position, so that owing to the plurality of active coil sections 71 in any case a good communication via at least one of these coil sections 71 is assured with a transponder 18 situated in the clothing of the person wearing the belt and thus situated close to this at least one coil section 71.

Figure 9:
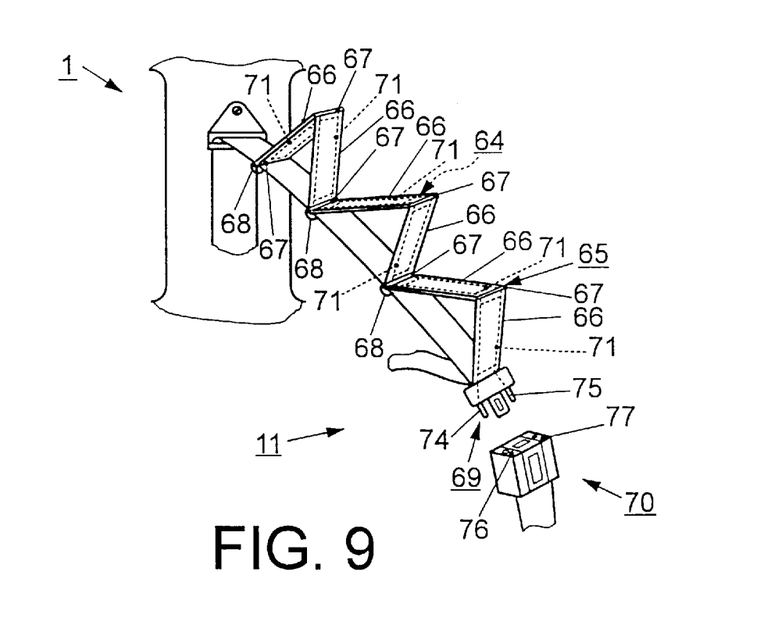
FIG. 9, in the same way as FIG. 7, shows a part of a product, i.e. a motor vehicle, in accordance with a third embodiment of the invention, contact means for the transmission coil accommodated in the meandrous or zigzag-shaped fold-up holder being arranged at the location of the seat-belt lug of the seat belt for the driver's seat, which contact means are engageable with mating contact means arranged at the location of the seatbelt buckle of the seat belt.

FIG. 9 shows a product in accordance with a third embodiment of the invention, which is also constituted by a motor vehicle 1 and which as regards the construction of the transmission coil 64 and the manner in which it is attached to the seat belt 11 is very similar to the motor vehicle 1 shown in FIGS. 6 to 8. A difference between the motor vehicle shown in FIGS. 6 to 8 and the motor vehicle 1 shown in FIG. 9 is that in the last-mentioned motor vehicle the transmission coil 64 is electrically connected to two contact pins 74 and 75 which are mechanically attached to the seat-belt lug 69 of the seat belt 11. Each of the two contact pins 74 and 75 can be brought into contact with a contact socket 76 or 77. The two contact sockets 76 and 77 are mechanically connected to the seat-belt buckle 70 of the seat belt 11. Connecting leads, not shown, connect the two contact sockets 76 and 77 to the transponder communication device of the motor vehicle 1 shown in FIG. 9.

In the motor vehicle 1 shown in FIG. 9 it is achieved in a simple manner that the transmission coil 64, which is mechanically connected to the seat belt 11, is not electrically connected to the transponder communication device until of the motor vehicle 1 of FIG. 1 until the seat belt 11 has been fastened, i.e. when the motor vehicle 11 is in its fastened position, as a result of which contacless communication between a transponder and the transponder communication device via the transmission coil 64 is only possible once the seat belt 11 has been fastened, which is advantageous and desirable in some operational situations.

Figure 2:
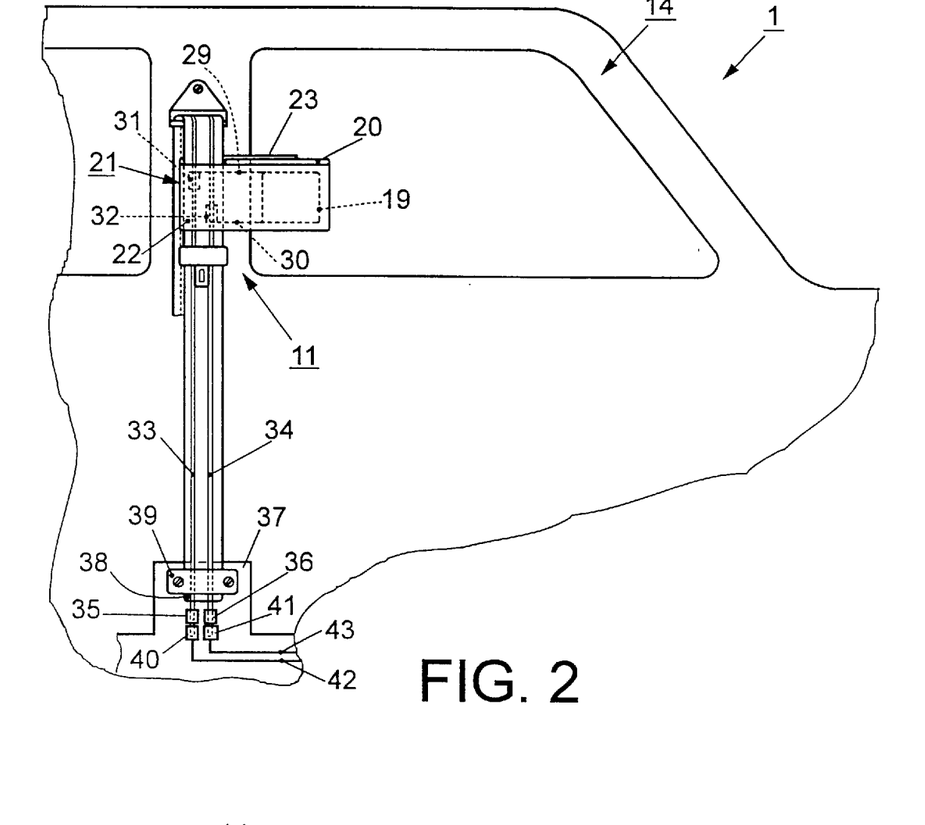
FIG. 2 shows a part of the motor vehicle of FIG. 1, viewed from the inside of the passenger compartment and including the seat belt for the driver's seat, the seat belt for the driver's seat being in its non-fastened released position and a holder for the transmission coil, which holder includes a transmission coil and is attached to the seat belt for the driver's seat, being situated in the area of the door window at the driver's side of the motor vehicle shown in FIG. 1.
Figure 3:
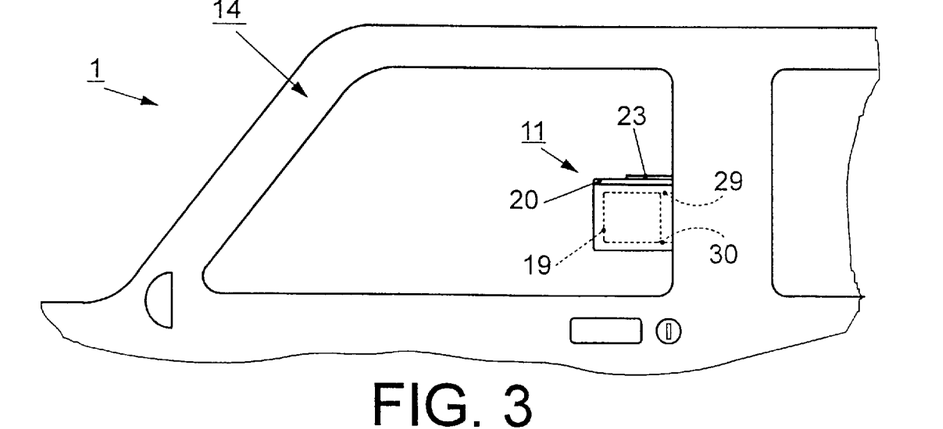
FIG. 3 shows a part of the motor vehicle of FIG. 1, viewed from the outside, the holder, which includes a transmission coil and is attached to the seat belt for the driver-s seat, being also situated in the area of the door window at the driver's side of the motor vehicle shown in FIG. 1.
Figure 10:
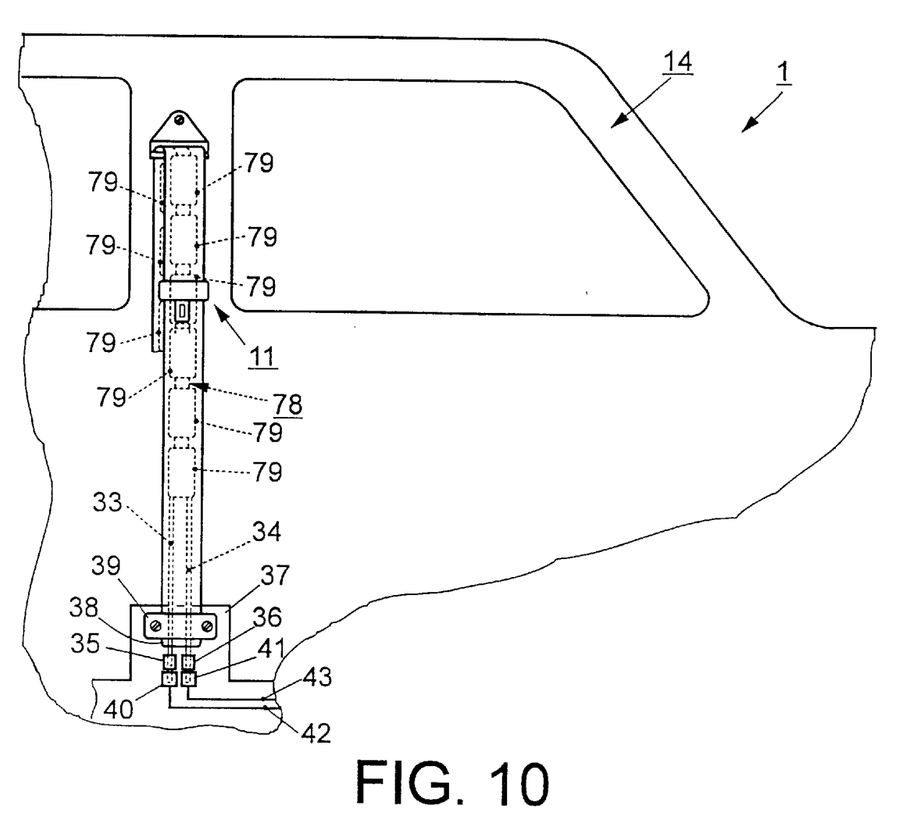
FIG. 10 shows a product, i.e. a motor vehicle in accordance with a fourth embodiment of the invention, in which a transmission coil has been integrated in a seat belt for the driver's seat.

FIG. 10, in the same way as FIG. 2, shows a product in accordance with a fourth embodiment of the invention, which is also constituted by a motor vehicle 1. The motor vehicle 1 shown in FIG. 10 is of a construction partly similar to that of the motor vehicle 1 as shown in FIGS. 1 to 5. A difference between the motor vehicle 1 as shown in FIGS. 1 to 5 and the motor vehicle as shown in FIG. 10 is that in the last-mentioned embodiment a transmission coil 78 is integrated in the seat belt 11. The transmission coil 78 now comprises successive coil sections 79, which like in the transmission coil 64 of the motor vehicle 1 shown in FIGS. 6 and 8 are arranged electrically in series. In order to integrate the transmission coil 78 in the seat belt 11 the transmission coil 78, i.e. its coil sections 79, can be woven into the belt fabric.

The motor vehicle 1 shown in FIG. 10 also has the advantages obtained by means of the motor vehicle 1 of FIGS. 6 to 8. However, in the motor vehicle 1 shown in FIG. 10 it is moreover achieved that the transmission coil 78 is accommodated in the seat belt 11 in a particularly reliable manner.

The invention is not limited to the embodiments described hereinbefore. For example, a transmission coil can alternatively be mechanically connected to a seat belt in that a transmission coil is arranged in a hose-like holder and the hose-like holder is directly slid onto the seat belt during the production of the motor vehicle or the hose-like holder is provided with separate fastening means with which this holder can be attached to a seat belt. A transmission coil, which is mechanically attached to a seat belt, can also be electrically connected to a transponder communication device in another manner than shown and described for the above embodiments. In contradistinction to the embodiments described hereinbefore, it is also possible to connect the connecting leads, which are mechanically attached to a seat belt, to contact pins arranged at the other end of the seat belt than in the case of the embodiment described herein. Finally, it is to be noted that a transmission coil cannot only be connected mechanically to the seat belt for the driver's seat but that for all the other seat belts in a motor vehicle it is likewise possible to connect a transmission coil mechanically to the relevant seat belt.

I claim:

1. A seat belt which is adjustable between a released position and a fastened position, where in its fastened position a person can be secured to the seat, the seat belt comprising a transmission coil for connection to a transponder communication device, and for receiving transponder signals from a transponder.

2. A seat belt as claimed in claim 1, wherein the transmission coil is accommodated in a plastic holder to which fastening means are connected.

3. A seat belt as claimed in claim 2, wherein the fastening means are formed by a U-shaped fastener which adjoins the seat belt.

4. A seat belt as claimed in claim 1, wherein the transmission coil is accommodated in a holder which can be folded up in an accordion-like manner, forming coil sections, and which can be unfolded along the seat belt during adjustment of the seat belt from its released position into its fastened position.

5. A seat belt as claimed in claim 4, wherein at least two coil sections, connected by a meander link, each.

6. A seat belt as claimed in claim 2, wherein the holder is adjustably attached to the seat belt by the fastening means.

7. A seat belt as claimed in claim 1, wherein the transmission coil comprises to contact means located in an area of an end portion by which the seat belt is secured.

8. A seat belt as claimed in claim 1, wherein the transmission coil comprises to contact means located in a seat-belt lug and which correspond to contact means connected to a seat-belt buckle.

9. A seat belt assembly for use in a vehicle comprising:

a transponder communication device for communicating with a transponder through a transmission coil, and, a seat belt which is adjustable between a released position and a fastened position, where in its fastened position, a person can be secured to a seat, wherein the seat belt includes the transmission coil which receives transponder signals from the transponder.

* * * * *